United States Patent [19]

Kim

[11] Patent Number: 5,453,793
[45] Date of Patent: Sep. 26, 1995

[54] METHOD FOR RECORDING A SERIES PROGRAM IN A VIDEO CASSETTE RECORDER

[75] Inventor: Jae-Hak Kim, Incheon, Rep. of Korea

[73] Assignee: Daewoo Electronics Co., Ltd., Seoul, Rep. of Korea

[21] Appl. No.: 329,365

[22] Filed: Oct. 26, 1994

[30] Foreign Application Priority Data

Oct. 26, 1993 [KR] Rep. of Korea .................. 93-22359

[51] Int. Cl.$^6$ ............................................. H04N 5/782
[52] U.S. Cl. ...................... 348/460; 358/335; 360/33.1; 368/10
[58] Field of Search .................... 348/460, 563, 348/569, 570, 731, 734; 358/335; 368/10, 28, 29; 360/10.3, 33.1, 71; 455/181.1, 185.1, 186.1; H04N 5/782, 5/44

[56] References Cited

U.S. PATENT DOCUMENTS

| | | | |
|---|---|---|---|
| 4,325,081 | 4/1982 | Abe et al. ................................. | 358/335 |
| 4,641,205 | 2/1987 | Beyers ...................................... | 358/335 |
| 4,706,121 | 11/1987 | Young ....................................... | 348/461 |
| 4,786,982 | 11/1988 | Wakahara et al. ....................... | 358/335 |
| 4,796,107 | 1/1989 | Hiraki ....................................... | 358/335 |
| 4,847,696 | 7/1989 | Matsumoto et al. ..................... | 358/335 |
| 4,905,212 | 2/1990 | Wakahara ................................. | 368/10 |
| 4,908,707 | 3/1990 | Kinghorn ................................. | 348/460 |
| 4,959,720 | 9/1990 | Duffield et al. .......................... | 348/731 |
| 4,963,994 | 10/1990 | Levine ...................................... | 358/335 |
| 5,166,911 | 11/1992 | Misewa et al. .......................... | 358/335 |
| 5,307,173 | 4/1994 | Yuer et al. ................................ | 358/335 |
| 5,353,121 | 10/1994 | Young et al. ............................. | 348/563 |

*Primary Examiner*—Victor R. Kostak
*Assistant Examiner*—Michael H. Lee
*Attorney, Agent, or Firm*—Anderson Kill Olick & Oshinsky

[57] ABSTRACT

Recording of a weekly serial TV program which is broadcast at least two times or more a week at designated times in a video cassette recorder having a system controller, wherein the system controller is provided with a memory and a timer for expressing a current time, a current day of the week and a current day/month, is carried out by way of: (a) setting at the memory a recording start date and a recording end date to fix the overall term of recording the weekly serial TV program; two or more days of the week on which the weekly serial TV program is broadcast; a recording start time and a recording end time to designate the duration of recording each segment of the weekly serial TV program; (b) comparing the current day/month with the recording start day/month set at the memory to determine if the current day/month has reached the recording start day/month; (c) comparing the current day of the week with each of the two or more days of the week set at the memory to determine if the current day of the week has reached any of the two or more days of the week; (d) comparing the current time with the recording start time and the recording end time to continue the recording of said each segment of the weekly serial TV program during the designated duration; (e) repeating said steps of (c) and (d) until the current day reaches the recording end date.

1 Claim, 4 Drawing Sheets

5,453,793

METHOD FOR RECORDING A SERIES PROGRAM IN A VIDEO CASSETTE RECORDER

FIELD OF THE INVENTION

The present invention relates to a method for recording a desired television broadcast program in a video cassette recorder ("VCR"), and, more particularly, to a method for recording a desired television ("TV") program which is broadcast twice or more a week at designated times in a series.

DESCRIPTION OF THE PRIOR ART

Nowadays, most VCRs are provided with the capability of recording a desired TV broadcast program at a designated time for a certain duration under the control of a timer. In order to set up the VCR to record the desired TV broadcast program in advance, various preprogramming information must be inputted through a series of operations, which may comprise: fixing time data in the order of month, day and year to designate when the recording of the desired program is to be carried out; setting a recording start time and a recording end time; selecting any one of the tape running speeds, e.g., SP(standard playback), LP(long playback) and EP(extended playback); selecting a TV channel through which the desired broadcast program is to be received; and then pressing a RECORD key on the VCR or a remote control unit.

In addition, the VCR may employ a scheme known as "every week programming" which is capable of recording a weekly serial TV program which is broadcast on once a week basis at a designated time. The weekly recording can be accomplished by inputting the preprogramming information.

In case where, however, the weekly serial TV program is broadcast twice or more every week, the inputting of the preprogramming information should be repeated as often as the frequency of the weekly program, which is rather inconvenient and may increase the possibility of erroneously operating the preprogramming process.

SUMMARY OF THE INVENTION

It is, therefore, a primary object of the invention to provide an improved method for recording a weekly serial TV program which is broadcast twice or more a week, which is substantially simpler and faster than the existing techniques.

In accordance with the present invention, there is provided a method for recording a weekly serial TV program which is broadcast at least two times or more a week at designated times in a video cassette recorder having a system controller, wherein the system controller is provided with a memory and a timer for expressing a current time, a current day of the week and a current day/month, wherein the method comprises the steps of: (a) setting at the memory a recording start day/month and a recording end day/month to fix the overall term of recording the weekly serial TV program; two or more days of the week on which the weekly serial TV program is broadcast; and a recording start time and a recording end time to designate the duration of recording each segment of the weekly serial TV program; (b) comparing the current day/month with the recording start day/month set at the memory to determine if the current day/month has reached the recording start day/month; (c) comparing the current day of the week with each of the two or more days of the week set at the memory to determine if the current day of the week has reached any of the two or more days of the week; (d) comparing the current time with the recording start time and the recording end time to continue the recording of said each segment of the weekly serial TV program during the designated duration; (e) repeating said steps of (c) and (d) until the current day/month reaches the recording end day/month.

BRIEF DESCRIPTION OF THE DRAWINGS

The above and other objects and features of the present invention will become apparent from the following description of preferred embodiments taken in conjunction with the accompanying drawings, in which.

DETAIL DESCRIPTION OF THE PREFERRED EMBODIMENTS

Figure 1:
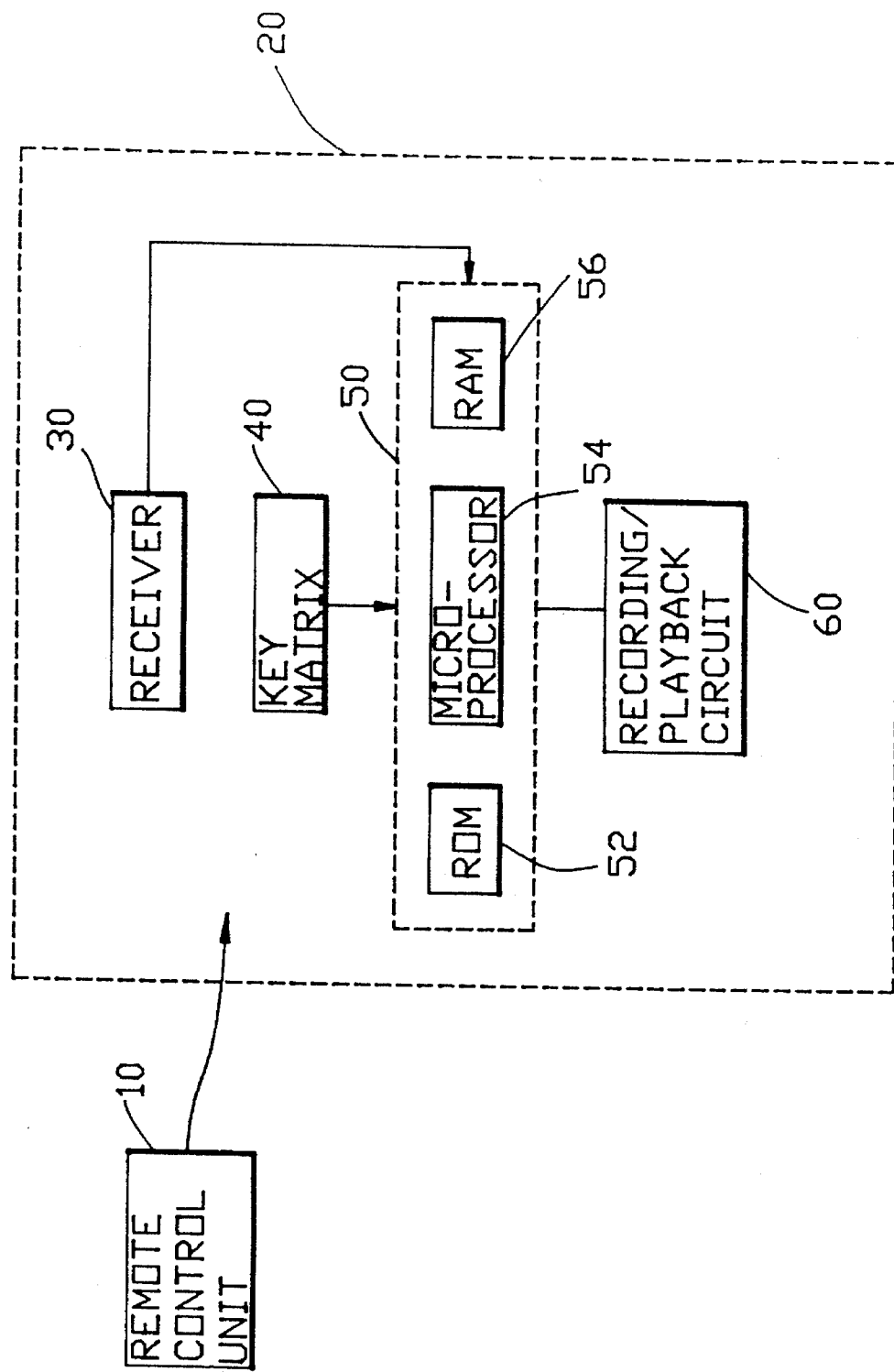
FIG. 1 is a schematic block diagram of a VCR for recording a weekly serial program in accordance with the present invention.

Referring to FIG. 1, there is shown a VCR 20 capable of recording a weekly serial TV program which is broadcast at least twice or more a week in accordance with the present invention. The VCR 20 has basic components: a system controller 50, a recording/playback circuit 60 and a receiver 30.

The system controller 50, which may be implemented with a microcomputer, includes a microprocessor 54, a read only memory (ROM) 52 in which various programs are stored, a random access memory (RAM) 56 to store data and preprogramming information that may be changed or updated during the operation of the microprocessor 54. Also, the system controller 50 is provided with a timer (not shown) for providing the present time, present day of the week and present day and month.

The recording/playback circuit 60 connected to the system controller 50 performs loading and unloading of a videotape, recording of video signals on the video tape, reproduction of the video signals from the video tape and the like.

The key matrix 40 includes a number of keys which may be the same as those in a remote control unit 10 which will be fully discussed hereinafter.

Connected to the system controller 50 is the receiver 30 which receives a command signal transmitted from the remote control unit 10 and converts the command signal to an electrical signal for the system controller 50.

Figure 2:
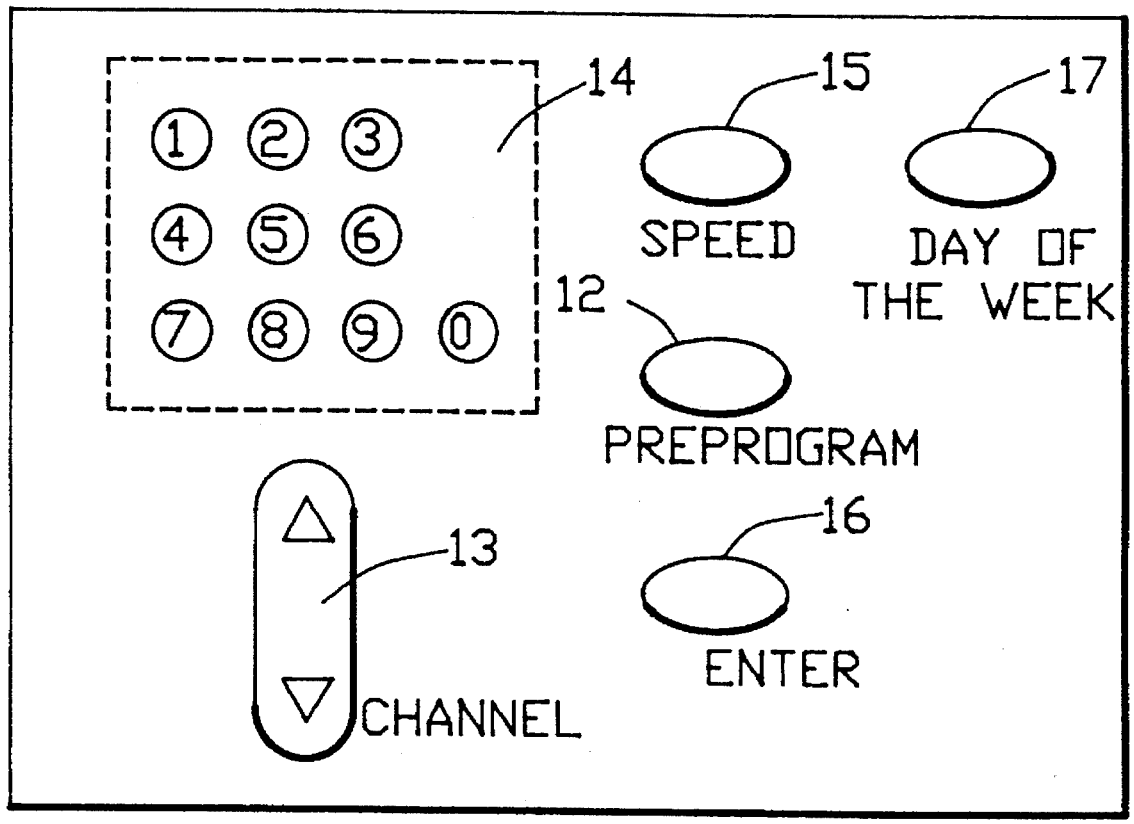
FIG. 2 is a detail description of the key matrix shown in FIG. 1.

As clearly shown in FIG. 2, the remote control unit 10 includes a preprogramming key 12 for generating a preprogramming start signal, a channel selection key 13 and numeric keys 14 for selecting a channel, a tape speed selection key 15 for selecting any one of the available tape speeds such as SP, LP and EP, a day of the week selection key 17 for selecting one of the days of the week, and an enter key 16 for entering these pieces of information into the VCR 20.

The recording of the weekly serial TV program of the present invention will now be explained in details with reference to FIGS. 3A and 3B, wherein it is assumed that the weekly program is broadcast two days of the week, e.g., every Monday and Friday, in a series.

Figure 3A:
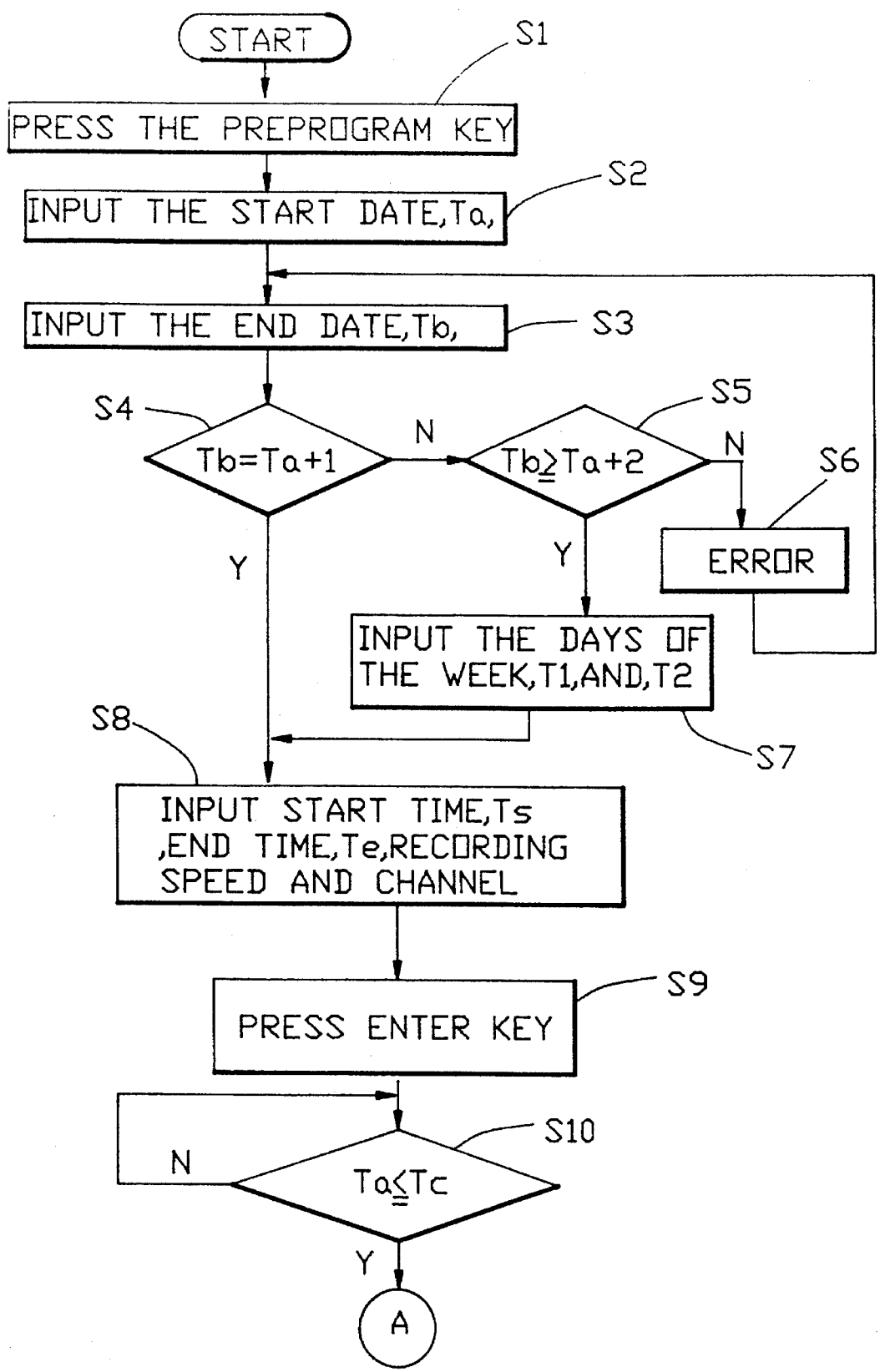
FIGS. 3A and 3B are the flow chart explaining the method for preprogramming a weekly serial TV program in accordance with the invention.
Figure 3B:
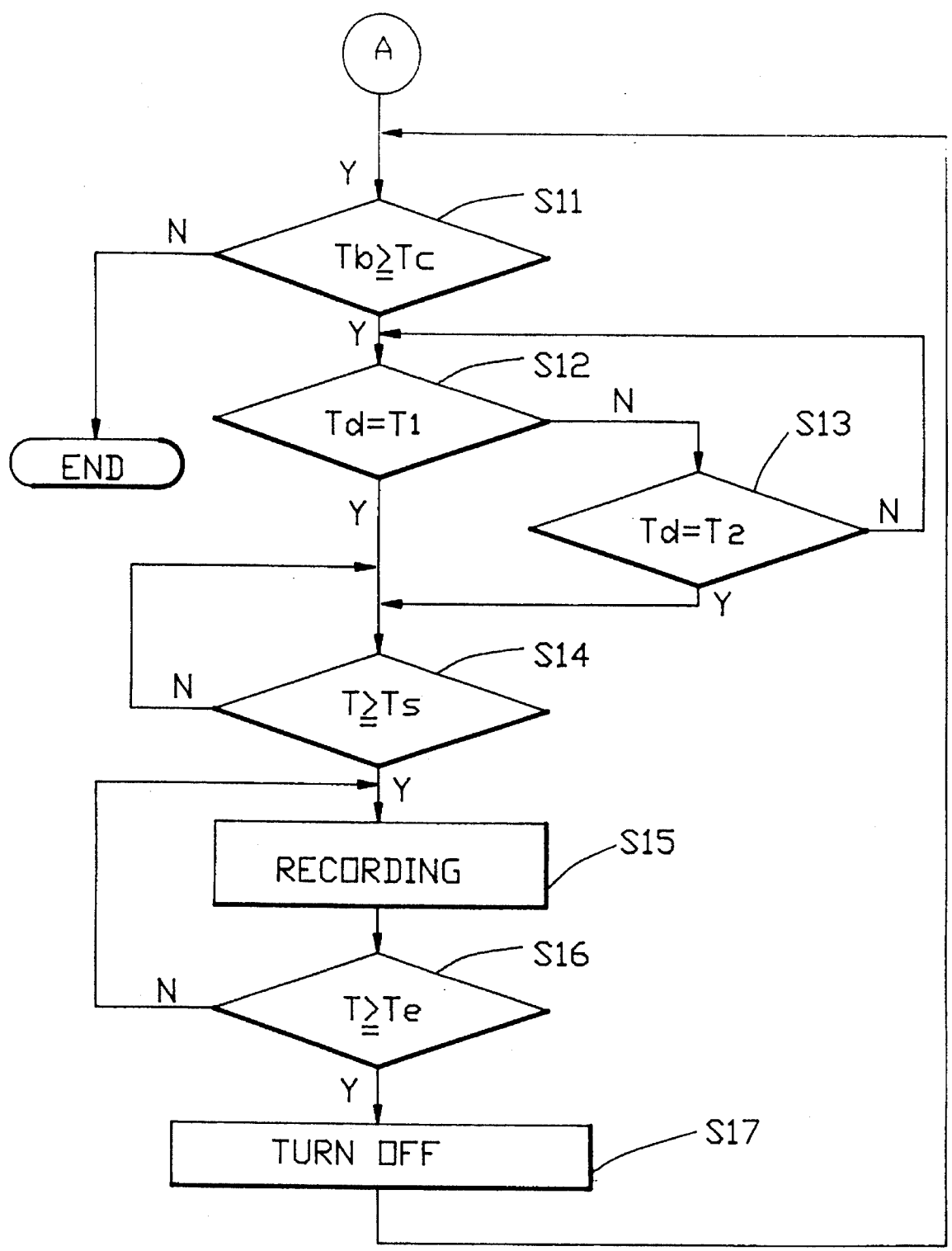

As shown in FIGS. 3A and 3B, at step S1, the recording of the weekly serial program is initiated by pressing the preprogramming key 12 on the remote control unit 10 or the key matrix 40 so as to input the preprogramming start signal to the system controller 50.

At step S2, the start date "Ta" for the recording of a desired weekly serial TV program is inputted by the numeric keys 14 on the remote control unit 10 or the key matrix 40 to the system controller 50.

At step S3, the end date "Tb" for the recording of the desired weekly serial TV program is inputted through the use of numeric keys 14 to the system controller 50. Accordingly, the term for the weekly serial TV program is fixed at steps S2 and S3.

At steps S4 and S5, the system controller 50 determines if the term between the start date Ta and the end date Tb is longer than a predetermined reference term, i.e., at least two days for recording the weekly serial TV program of the present invention. First, at step S4, the system controller 50 compares the end date Tb with the start date incremented by the day "Ta+1". Once the end date is not equal to the start date incremented by a day Ta+1, the process flows to step S5. However, at step S4, if the end date is equal to the start date incremented by a day, i.e., if the term between the start date and the end date is merely a day, the process directly flows to step S8 without passing the process performed in step S7 which will be described hereinafter.

At step S5, the system controller 50 compares the end date with the predetermined reference term, i.e., the start date incremented by two days "Ta+2". If the end date is later or equal to the start date incremented by the two days, the process goes to step S7. However, at step S5, if it is determined that the end date is shorter than the start date incremented by the two days, the process goes to step S6 where the system controller 50 decides that the information is erroneous and then the process returns to step S3 for inputting correct term data.

At step S7, two or more days of the week when the weekly serial TV program is broadcast, e.g., Monday and Friday of the week "T1" and "T2", are sequentially inputted to the system controller 50 using the day of the week key 17 in the remote control unit 10. Thereafter, the process goes to step S8.

At step S8, the start time, the end time, the recording speed and the channel for the recording of the weekly serial TV program are inputted to the system controller 50 by using their corresponding keys 14, 15, 13 on the remote control unit 10.

At step S9, the enter key 16 is pressed for setting the preprogramming information as set forth into the system controller 50.

At step S10, it is tested whether or not the current date Tc has reached the recording start date Ta. If the test result is YES, i.e., Ta≤Tc, the process goes to step S11.

At step 11, it is determined whether or not the current date Tc is still within the recording term. If this condition is satisfied, i.e., Tb≥Tc, the process flows to step S12. If not, i.e., Tb<Tc, the present recording process is ended because the term for the recording the weekly serial TV program is over.

At steps S12 and S13, it is determined whether the current day of the week "Td" falls on each of the days of the week, T1 or T2, which is set at step S7. If the current day of the week matches any one of the days of the week T1 and T2, the process flows to step S14.

At step S14, it is determined whether or not the current time "T" has reached the recording start time Ts. If affirmative, the process flows to step S15.

At step S15, the VCR is turned on and the weekly serial TV program is recorded on the video tape by the recording/playback circuit 60 in accordance with the recording channel and speed.

At step S16, it is determined whether the current time T has reached the recording end time Te. If the recording is completed, the system controller 50 turns off the VCR to stop the recording of the serial program, and the process returns to step S11.

While the present invention has been shown and described with respect to the preferred embodiments, it will be apparent to those skilled in the art that many changes and modifications may be made without departing from the spirit and scope of the invention as defined in the appended claim.

What is claimed is:

1. A method for recording a weekly serial television program which is broadcast at least two times or more a week at designated times in a video cassette recorder having a system controller, wherein the system controller is provided with a memory and a timer for expressing a current time, a current day of the week and a current day/month, said method comprising the steps of:

(a) setting at the memory a recording start date and a recording end date to fix the overall term of recording the weekly serial TV program; two or more days of the week on which the weekly serial TV program is broadcast; a recording start time and a recording end time to designate the duration of recording each segment of the weekly serial TV program;

(b) comparing the current day/month with the recording start day/month set at the memory to determine if the current day/month has reached the recording start day/month;

(c) comparing the current day of the week with each of the two or more days of the week set at the memory to determine if the current day of the week has reached any of the two or more days of the week;

(d) comparing the current time with the recording start time and the recording end time to continue the recording of said each segment of the weekly serial TV program during the designated duration;

(e) repeating said steps of (c) and (d) until the current day reaches the recording end date.

* * * * *